UNITED STATES PATENT OFFICE.

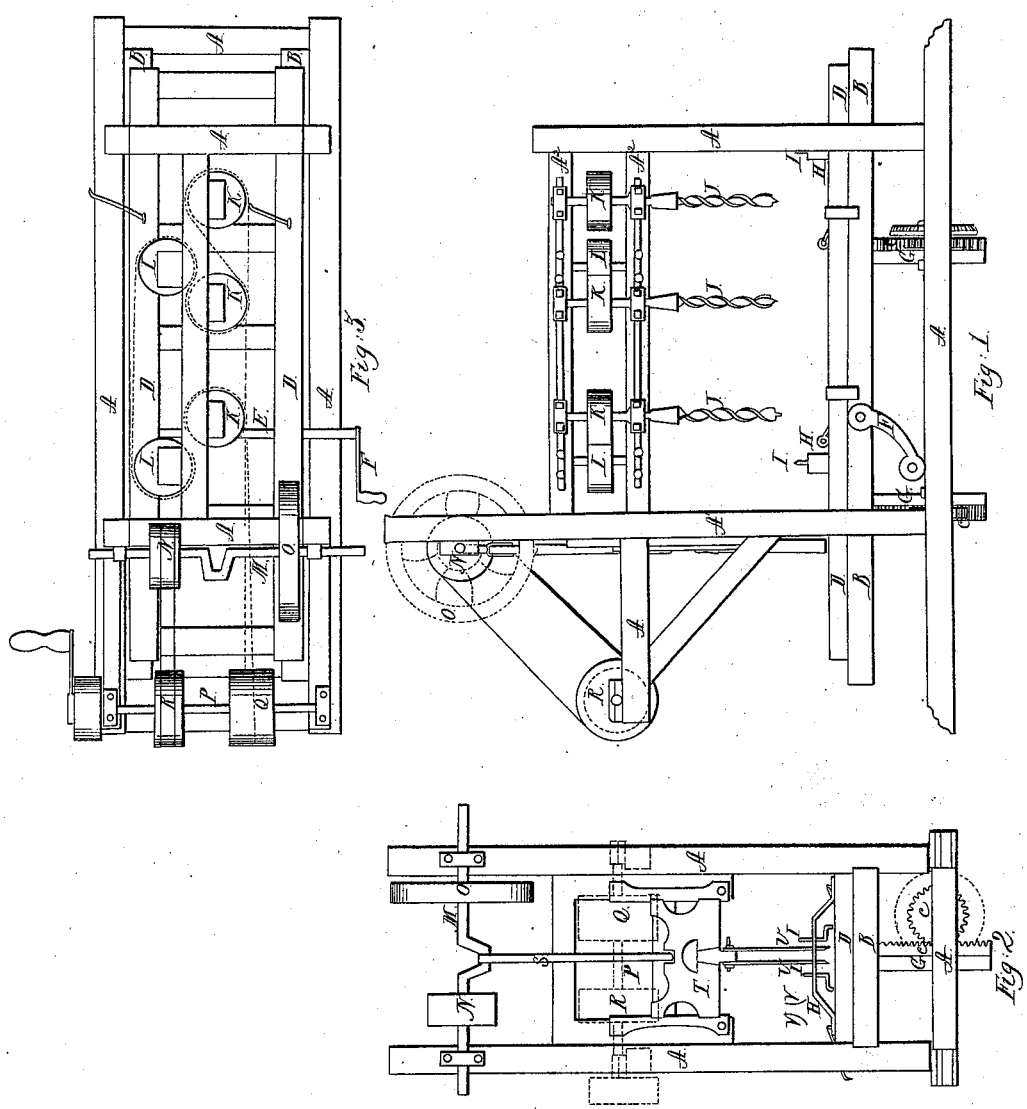
W. Mace,
Mortising Machine,
Nº 140.
Patented Mar. 11, 1837.

WANDLE MACE, OF NEW YORK, N. Y.

MACHINE FOR MORTISING POSTS AND SHARPENING RAILS FOR FENCES.

Specification of Letters Patent No. 140, dated March 11, 1837.

*To all whom it may concern:*

Be it known that I, WANDLE MACE, of the city of New York, in the State of New York, have invented a new and useful Machine for the Purpose of Mortising Posts and Sharpening Rails for Fences, and that the following is a full and exact description thereof, reference being had to the drawing which accompanies and makes a part of this specification.

Figure 1, is a side view, Fig. 2, a front and Fig. 3 is a top view of the machine; and in each of the figures the same letters of reference are employed to designate similar parts.

B, B, is a movable frame, or platform, of timber, contained within the frame A, A, within which it is made to slide up and down by means of racks and pinions C, C; the pinions being fixed upon a shaft which runs longitudinally with the machine, and may be turned by a winch at one end, or the shaft may be turned by bevel geared wheels from one side. The frame, B, is notched into the uprights A′, A′, to guide it up and down correctly.

D, D, is a carriage which traverses backward and forward upon the frame B, like a saw mill carriage upon its ways; upon its under side it has racks, into which pinions on the shaft E, engage, causing the carriage to traverse when the winch F is turned. The racks C, C, are affixed to stout pieces of timber G, G, which are framed into the middle of the cross pieces of the platform, or frame, B, B. By means of the arrangement thus described, it will be apparent that when posts, or rails, are placed upon the carriage D, D, they may be moved up and down, or backward and forward, as may be desired. The posts, or rails, are to be held down upon the carriage, by means of dogs, or other analogous contrivances; to cause them to lie steadily, although irregular and winding, instead of placing them upon the cross pieces of the carriage, I generally use iron bearing pieces, H, Fig. 3, crossing, and affixed to, the carriage, with set screws I, I, passing through them, the points of which are made to bear against the post, or rail.

J, J, J, are augers revolving vertically, having bearings in the two pieces of timber $A^2 A^2$, and whirls, K, K, upon their shanks, which, with the assistance of the tightening and directing whirls L, L, receive the band by which they are made to revolve, the arrangement of which band is shown by the dotted line in Fig. 3. By means of slots and tightening screws in the timbers $A^2, A^2$, the augers may be shifted to any required distance.

The general moving power by which the augers are made to revolve, and the mortising and pointing apparatus operated upon is applied to the shaft P, upon which are the whirls Q and R. The place of these being shown by red lines on the front view, Fig. 2. A band from the whirl R, turns the whirl N, upon the crank shaft M, a fly-wheel, O, being fixed on the same shaft. The mortising and pointing apparatus is shown in this figure, as operated by the crank upon the shaft M. The pitman, S, works the sliding gate T, upon which are the knives, or chisels, U, U, by which the mortising and pointing are effected. For mortising, the chisels are made straight on their edges; but when rails are to be pointed, knives, or cutters, with curved edges are substituted, as shown at V, V.

When a post is to be bored and mortised, it is secured in its place as above indicated, and is forced upward, or moved longitudinally, as may be required, and is brought, after being bored, under the chisels, U, U. which remove the superfluous stuff between the holes. Rails to be pointed, are brought under the edges of the curved knives, and enter between them where the blades recede from each other, and are passed forward by the carriage, as far as may be necessary to adapt them to the mortises.

Having thus, fully set forth the construction of my said machine, and explained the manner in which the same is to be used, I do hereby declare that I do not claim any of the individual parts thereof, taken separately; nor do I claim the driving of two, or more, augers in the same machine for the purpose of boring timber to be mortised, or the mortising thereof by means of knives, or chisels, worked by a sliding gate, these operations have been previously performed in separate machines, by means analogous to those herein described. But What I do claim is—

The manner in which the boring, mortising, and rail pointing apparatus are combined together in one machine, so that the posts may be bored and mortised without shifting the stuff; and rails may be pointed by the use of the same carriage and apparatus, by changing the knives only; the arrangements being made substantially in the manner herein set forth.

WANDLE MACE.

Witnesses:
ERASTUS BUCK,
JOHN MACE.